Sept. 1, 1931.  R. DREYHAUPT  1,821,743
METHOD AND DEVICE FOR TURNING OUT THE RINGS OF
ROLLER BEARINGS AND SIMILAR GROOVED RINGS
Filed March 15, 1929
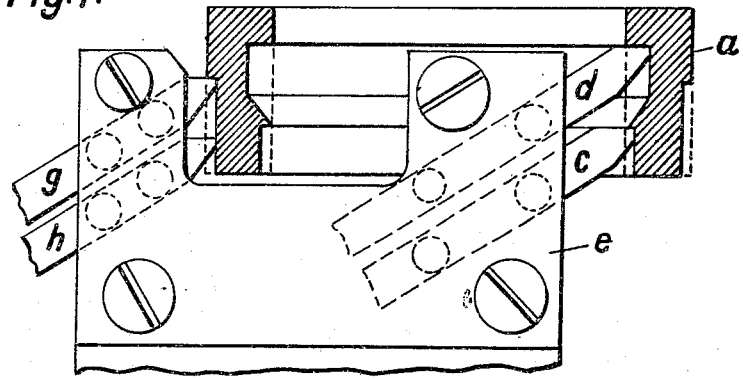
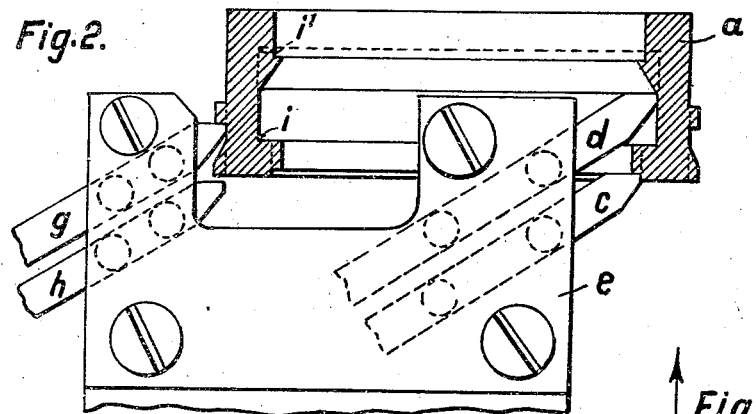
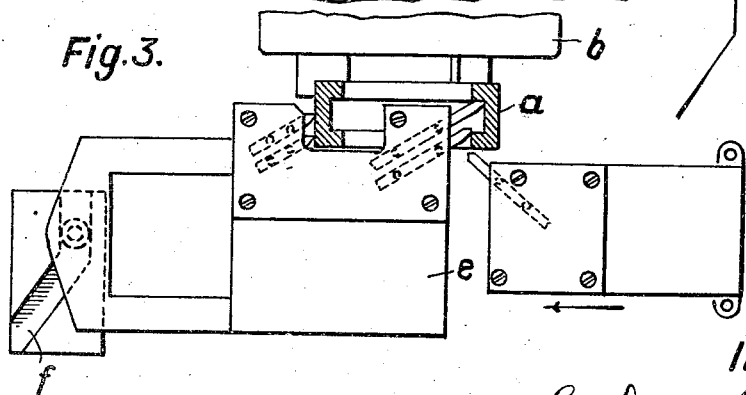
Inventor
R. Dreyhaupt
BY Langner, Parry, Card & Langner
ATTYS.

Patented Sept. 1, 1931

1,821,743

UNITED STATES PATENT OFFICE

RUDOLF DREYHAUPT, OF BERLIN, GERMANY

METHOD AND DEVICE FOR TURNING OUT THE RINGS OF ROLLER BEARINGS AND SIMILAR GROOVED RINGS

Application filed March 15, 1929, Serial No. 347,406, and in Germany March 16, 1928.

It is known to turn out the rings of roller-bearings and similar bearing rings in such a manner that the rings in planes through the axis of same obtain a U-shaped cross-section with an interior roller-race. The turning out of the rings on the inner side of the same is connected with special difficulties, because it is not possible with the cutter in the same direction of feed to reach the entire, deep set-off face and the faces of the roller race on the inner side of the ring, which are lying perpendicularly to the first mentioned face.

The only way to obtain a satisfactory result was hitherto to treat the work piece in different stages, whereby the ring first was cut in a direction parallel to its axis, whereupon by means of a special steel or a special working device the cutting operation was continued perpendicularly to the said axis of the work piece.

The present invention relates to a method and device by means of which a ring of U-shaped cross-section in planes through the axis of same may be cut out with an ordinary cutter in the course of two working stages. The method consists mainly therein, that the turning tool is moved after an obtuse angle, the one leg of which is lying parallel to the axis of the work piece, and that the work piece is turned about an angle of 180° between two or more of such working stages.

The practical employment of the method according to the present invention will now be described in connection with an apparatus, which also form part of the invention and a preferred form of which is shown as an example in the accompanying drawings.

Fig. 1 shows a work piece in cross-section and the turning tools which have been used during the first stage of operation.

Fig. 2 shows the same work piece after it has been turned about 180° in the position in which the second stage of operation and the finishing are carried out.

Fig. 3 shows the arrangement of the turning tools and the movement of the support in a multi-tool lathe.

Fig. 4 illustrates by means of an arrow the working movement of the turning tools and the support.

The work piece $a$ is fixed to the face plate $b$ of a lathe of known kind, for instance a multi-tool lathe. The tool $c$ by means of which the path or race on the outer set off edge face is turned out is arranged on the support $e$ in a somewhat retracted position, corresponding to the depth of the roller-race, so that it first becomes operative after the tool $d$ has performed a preliminary cut. If desired, the support may, as shown in the drawings, be arranged with two additional tools, which cut longitudinally on the outer face of the ring. The tools are all located on the same support $e$, which for instance by means of the substantially angular guide $f$ is moved in a fixed direction, as indicated by the arrow in Fig. 4. The figures make it clear, that the support by means of a suitable device is moved in such a manner, that the tools first are carried towards the work piece. As soon as the tool $d$ has reached the spot in which the race of the roller-ring commences the support is by means of the substantially angular guide moved along a line which forms an angle with the axis of the work piece, whereby a conical recess is formed in the work piece. The support is thereupon by means of the substantially angular guide moved in a direction parallel to the axis of the work piece, until the tool reaches the edge at the end of the race. Through this operation a cylindrical groove is formed. This part of the turning operation may of course be carried out in more stages until one half of the work piece, respectively of its race has received a cylindrical bore. Simultaneously the retracted tool $e$ will as soon as it reaches the work piece perform the turning out of the edge face. Hereby the tools $g$ and $h$ will cut on the outer face of the ring and the tool in the second support (Fig. 3) will cut on the plane face.

When the roller-ring during the first stage of the working process has been automatically treated until the finishing can take place the ring is turned 180° and is anew fixed to the face plate, whereupon the second half of the ring is treated in the same manner. During this treatment the ring takes up the position indicated in Fig. 2.

The cutter $d$ is equipped with a second cutting edge, which is arranged perpendicularly to the feed direction of the cutter. As soon as this cutting edge reaches the already treated race in the interior of the ring the remaining conical part on the remote side will be removed, so that a smooth race is obtained between the edges $i$ and $i^1$. Simultaneously the other tools are cutting in the manner described above on the plane face, the outer face and the edge face of the remaining limiting edge of the race groove.

The invention makes it possible to cut all faces of the roller-ring simply by turning the ring about 180°, and working in two stages with the same tools. The tools need not be removed from the support during the treatment and no readjustments are necessary until the operation has been finished.

Through the arrangement of the tools and the ring a uniform and exact treatment of the race is secured for all parts of the same, without the tools being unduly worn and with a relatively low expenditure of energy.

It would require a much greater expenditure of energy and wear on the tools to employ a single cutter for the entire width of the groove, in order to turn out the U-shaped portion in a single operation. The ring consists of a very hard material, usually a chrome-steel-alloy, wherefore the tools used on the same are especially exposed to wear.

As indicated in the drawings the support is formed with a recess in which the tools are located, which operate on the outer face of the ring. The cutters $c$ and $d$ for the treatment of the inner race may of course also be arranged in the recessed part of the support. In this case the tools which turn the outer face of the ring must be arranged in another manner, for instance on a special support, which is not controlled from the curved guide.

I claim:—

1. A method of turning out rings of U-shaped cross-section in planes through the axis of same, such as roller-bearing-rings and similar bodies, which method consists in moving the turning tool after an obtuse angle, one leg of which is running in a direction parallel to the axis of the work piece and turning the work piece about 180° between a plurality of such working stages.

2. A method of turning out rings of U-shaped cross-section in planes through the axis of same, such as roller-bearing-rings and similar bodies, which method consists in moving the turning tool after an obtuse angle, one leg of which is running in a direction parallel to the axis of the work piece and turning the work piece about 180° between two such working stages.

3. In a device for turning out rings of U-shaped cross-section in planes through the axis of same, such as roller-bearing-rings and similar bodies, a support, a device adapted to move said support after an obtuse angle, one leg of which is running in a direction parallel to the axis of the work piece and a tool adapted to successively cut on two faces located at right angles to each other.

4. In a device for turning out rings of U-shaped cross-section in planes through the axis of same, such as roller-bearing-rings and similar bodies, a support, a substantially angular guide for moving said support after an obtuse angle, one leg of which is running in a direction parallel to the axis of the work piece and a tool adapted to successively cut on two faces located at right angles to each other.

5. In a device for turning out rings of U-shaped cross-section in planes through the axis of same, such as roller-bearing-rings and similar bodies, a support, a substantially angular guide for moving said support after an obtuse angle, one leg of which is running in a direction parallel to the axis of the work piece, a tool arranged in said support and adapted to successively cut on two faces located at right angles to each other and other tools arranged in the same support and adapted to come into operation at a previously fixed stage of the working process.

6. In a device for turning out rings of U-shaped cross-section in planes through the axis of same, such as roller-bearing-rings and similar bodies, a support, a substantially angular guide for moving said support after an obtuse angle, one leg of which is running in a direction parallel to the axis of the work piece, a tool arranged in said support and adapted to successively cut on two faces located at right angles to each other and other tools arranged in the same support and adapted to come into operation when the support commences to move parallelly to the longitudinal axis of the work piece.

7. In a device for turning out rings of U-shaped cross-section in planes through the axis of same, such as roller-bearing-rings and similar bodies, a support, a substantially angular guide for moving said support after an obtuse angle, one leg of which is running in a direction parallel to the axis of the work piece, a tool arranged in said support and adapted to successively cut on two faces located at right angles to each other, other tools arranged in the same support and adapted to come into operation when the support commences to move parallelly to the longitudinal axis of the work piece, a second support and still another tool arranged in said second support and adapted to cut the plane face of the work piece.

In testimony whereof I affix my signature.

RUDOLF DREYHAUPT.